US011778011B2

(12) United States Patent
Shaules et al.

(10) Patent No.: US 11,778,011 B2
(45) Date of Patent: Oct. 3, 2023

(54) LIVE STREAMING ARCHITECTURE WITH SERVER-SIDE STREAM MIXING

(71) Applicant: Infrared5, Inc., Jamaica Plain, MA (US)

(72) Inventors: Andrew Shaules, Tacoma, WA (US); Chris Allen, Jamaica Plain, MA (US); Davide Lucchi, Boston, MA (US); Todd Anderson, Middlebury, VT (US)

(73) Assignee: Infrared5, Inc., Jamaica Plain, MA (US)

( * ) Notice: Subject to any disclaimer, the term of this patent is extended or adjusted under 35 U.S.C. 154(b) by 0 days.

(21) Appl. No.: 17/477,093

(22) Filed: Sep. 16, 2021

(65) Prior Publication Data

US 2022/0094729 A1    Mar. 24, 2022

Related U.S. Application Data

(60) Provisional application No. 63/080,592, filed on Sep. 18, 2020.

(51) Int. Cl.
*H04L 65/75* (2022.01)
*G06F 3/14* (2006.01)
*H04N 21/218* (2011.01)
*H04N 21/2187* (2011.01)

(52) U.S. Cl.
CPC ............ *H04L 65/75* (2022.05); *G06F 3/1454* (2013.01); *H04N 21/2187* (2013.01); *H04N 21/21805* (2013.01)

(58) Field of Classification Search
CPC ..... H04L 65/75; H04L 65/611; H04L 65/765; G06F 3/1454; H04N 21/21805; H04N 21/2187; H04N 21/4788; G09G 2340/10; G09G 2340/125; G09G 2370/022; G09G 2370/027
See application file for complete search history.

(56) References Cited

U.S. PATENT DOCUMENTS

| 8,019,867 | B1 | 9/2011 | Allen et al. |
| 8,019,878 | B1 | 9/2011 | Allen et al. |
| 8,024,469 | B1 | 9/2011 | Allen et al. |
| 8,166,181 | B2 | 4/2012 | Allen et al. |
| 8,171,145 | B2 | 5/2012 | Allen et al. |
| 10,687,099 | B2 * | 6/2020 | Major ................. H04L 43/0876 |

(Continued)

OTHER PUBLICATIONS

U.S. Patent and Trademark Office, "International Search Report and Written Opinion", International Application No. PCT/US2021/050679, dated Jan. 20, 2022, 19 Pages.

*Primary Examiner* — Adil Ocak
(74) *Attorney, Agent, or Firm* — Patent GC LLC

(57) ABSTRACT

A live media streaming architecture facilitates live interaction among multiple participants, such as viewers and stage performers for a show. A cluster of computers is responsible for generating, transmitting, and displaying a composed live stream, such as a grid, of one group of individuals, by mixing live streams from those individuals, that will allow them to interact with a stage performer or other contributors or other individuals during an event. The architecture can support receiving the live streams at a physical location of an event or other locations for centralized redistribution.

20 Claims, 11 Drawing Sheets

(56) References Cited

U.S. PATENT DOCUMENTS

| | | | |
|---|---|---|---|
| 2013/0222601 A1* | 8/2013 | Engstrom | H04N 5/265 348/159 |
| 2016/0381109 A1* | 12/2016 | Barnett | H04N 21/2743 709/231 |
| 2017/0277909 A1* | 9/2017 | Kraemer | G06F 21/10 |
| 2019/0028465 A1 | 1/2019 | Allen et al. | |
| 2019/0320004 A1 | 10/2019 | Allen et al. | |
| 2019/0320014 A1 | 10/2019 | Allen et al. | |
| 2021/0019982 A1* | 1/2021 | Todd | H04N 21/4438 |

* cited by examiner

LIVE STREAMING ARCHITECTURE WITH SERVER-SIDE STREAM MIXING

CROSS-REFERENCE TO RELATED APPLICATIONS

This application is a non-provisional application claiming the benefit of, and priority to, U.S. Provisional Patent Application Ser. No. 63/080,592, filed Sep. 18, 2020, which is hereby incorporated by reference.

BACKGROUND

In many virtual events, there may be several groups of participants that wish to interact through live video streaming. For example, there may be an event with celebrities, press, and an audience of viewers, such as award shows, sporting events, live concerts, presentations, comedic performances, and the like. Current technology for virtual video streaming events does not allow for highly interactive engagement directly with the audience. Nor do current video streaming solutions allow many to many collaborations with more than a hundred or so participants at the same time. Performers using virtual platforms are thus stuck presenting to empty rooms with no feedback or audience reaction. Audience members likewise are isolated with a single stream of the performer without a feel for being a part of an audience. There is a need to bring remote audiences and other contributors into the live experience which was not previously possible in any elegant way.

SUMMARY

This Summary introduces a selection of concepts in simplified form that are described further below in the Detailed Description. This Summary neither identifies features as key or essential, nor limits the scope of the claimed subject matter.

A live media streaming architecture facilitates live interaction among multiple participants, such as viewers and stage performers for a show. A cluster of computers is responsible for generating, transmitting, and displaying a composed live stream, such as a grid, of one group of individuals, by mixing live streams from those individuals, that will allow them to interact with a stage performer or other contributors or other individuals during an event. The architecture can support receiving the live streams at a physical location of an event or other locations for centralized redistribution. The system can also be used in virtual space where no single main venue exists. In that scenario a performer may be working at home and viewing the grid on a large screen television or other electronic display. While the term "stage performer" is used throughout, this really could be any individual or group who is the focus of the experience such as a band, a dance group, a comedian, an inspirational speaker, a circus act, or any other individual or group of individuals.

Generally, a mixer is configured to receive streams of live streaming media, to generate a mixed stream based on the received streams, and to provide the mixed stream to the cluster of server computers. The mixed stream is made available by the cluster to subscriber devices as a stream of live streaming media. The sources of the live streaming media can be computers that capture media data of performers, individuals watching the performers, or both. Computers associated with the performers, individuals watching the performers, or both also can receive the streams of live streaming media and any mixed stream produced by the mixer.

In one aspect, a system for delivering live streaming media includes a cluster of computers and one or more mixers. The cluster of computers comprises at least one origin device configured to receive and forward streams of live streaming media received from at least one broadcaster device associated with a broadcaster, a plurality of edge devices configured to receive streams forwarded from the at least one origin device and to provide the received streams to at least one subscriber device, and a computer network interconnecting the origin devices and the edge devices for transmitting streams between the origin devices and the edge devices. A mixer is configured to receive streams of live streaming media, to generate a mixed stream based on the received streams, and to provide the mixed stream to the cluster. The mixed stream is made available by the cluster to the at least one subscriber device as a stream of live streaming media.

In one aspect, a system for delivering live streaming media includes at least one origin device configured to receive and forward streams of live streaming media received from at least one broadcaster device associated with a broadcaster. The system further includes a plurality of edge devices, each edge device configured to receive a stream forwarded from the at least one origin device and to provide the received stream to at least one subscriber device. A stream manager is configured to, in response to a request from a subscriber device to access a stream of live streaming media from a broadcaster, assign the subscriber device to an edge device from among the plurality of edge devices. A computer network interconnects the origin devices and the edge devices for transmitting streams between the origin devices and the edge devices. One or more mixers, each mixer receiving streams of live streaming media and generating a mixed stream based on the received streams. The mixed stream is made available to subscriber devices as a stream of live streaming media.

In one aspect, a system for delivering live streaming media includes at least one origin device configured to receive and forward streams of live streaming media received from at least one broadcaster device. The system further includes a plurality of edge devices, each edge device configured to receive a stream forwarded from the at least one origin device and to provide the received stream to at least one subscriber device. One or more mixers, each mixer receiving streams of live streaming media and generating a mixed stream based on the received streams. The mixed stream is made available to subscriber devices as a stream of live streaming media.

In one aspect, a system for delivering live streaming media includes at least one origin device configured to receive and forward streams of live streaming media received from at least one broadcaster device, a plurality of edge devices configured to receive streams forwarded from the at least one origin device and to provide the received streams to at least one subscriber device, and one or more mixers receiving streams of live streaming media and generating a mixed stream based on the received streams. The mixed stream is made available to subscriber devices as a stream of live streaming media.

In one aspect, a system for live streaming of media data includes at least one node receiving a live stream of an individual and a live stream from a selected one of a first plurality of participants and enabling live interaction between the individual and the selected participant over a cluster of nodes. The cluster of nodes further provides live streaming media data of the live interaction to yet additional devices for viewing.

In one aspect, a system for live streaming of media data includes one or more mixers, each mixer receiving live streams of media data of a first plurality of participants from a plurality of devices and generating a composed stream including the received live streams. The cluster of nodes further provides live streaming media data of the composed stream to yet additional devices for viewing.

In one aspect, in a system for delivering live streaming media including at least one origin device configured to receive and forward streams of live streaming media received from at least one broadcaster device associated with a broadcaster over a broadcaster network connection, and a plurality of edge devices, each edge device configured to receive a stream forwarded from the at least one origin device and to provide the received stream to at least one subscriber device over a subscriber network connection, means for receiving streams of live streaming media and means for generating a mixed stream based on the received streams, the mixed stream being made available to subscriber devices as a stream of live streaming media through the at least one origin device.

Any of the foregoing aspects can include one or more of the following features. At least one device of an individual is connected over a broadcaster network connection to provide a first stream of live streaming media including media data of the individual to the at least one origin device, and the least one device of the individual is connected over a subscriber network connection to receive a second stream of live streaming media from another from an edge device among the plurality of edge devices. At least one device of an individual is a performer computer, wherein the first stream provided by the performer computer includes media data of the individual, and the second stream received by the performer computer includes a mixed stream generated by the one or more mixers. At least one device of an individual is a viewer computer, wherein the first stream provided by the viewer computer includes media data of the individual provided to the one or more mixers, and the second stream received by the viewer computer includes a media stream based on the first stream provided by the performer computer.

Any of the foregoing aspects can include one or more of the following features, which optionally may be further in combination with any one or more of the foregoing features. The at least one device of an individual comprises at least one performer computer providing media data of a performer and a plurality of viewer computers providing media data of a plurality of respective viewers. The at least one performer computer is configured as a broadcaster device to provide the performer media data of the performer to the at least one origin device. The plurality of viewer computers are configured as broadcaster devices to provide the viewer media data to the at least one origin device The mixer is configured as a subscriber device to receive the viewer media data of at least some of the viewer computers through the plurality of edge devices. The mixer is configured as a broadcaster device to provide the mixed stream to the at least one origin device. The at least one performer computer is configured as a subscriber device to receive media data based on the mixed stream through an edge device.

Any of the foregoing aspects can include one or more of the following features, which optionally may be further in combination with any one or more of the foregoing features. The plurality of viewer computers include viewer computers configured as subscriber devices to receive a media stream based on the performer media data through an edge device. The plurality of viewer computers include viewer computers configured as subscriber devices to receive media data based on the mixed stream through an edge device. The plurality of viewer computers are configured as subscriber devices to receive a media stream based on the performer media data through an edge device. The plurality of viewer computers further include viewer computers configured as subscriber devices to receive media data based on the mixed stream through an edge device. The plurality of viewer computers further include viewer computers configured as subscriber devices to receive media data based on the mixed stream through an edge device.

Any of the foregoing aspects can include one or more of the following features, which optionally may be further in combination with any one or more of the foregoing features. A plurality of user devices for a plurality of users are configured such that each user has at least one device including a subscriber device and a broadcaster device. The mixer is configured to receive media data of at least some of the users from the plurality of user devices. The mixer is further configured as a broadcaster device to provide the mixed stream to the at least one origin device. At least one of the user devices is configured as a subscriber device to receive the mixed stream from the mixer. The mixer is configured as a subscriber device to receive the media data of at least some of the users from the plurality of user devices through the plurality of edge devices. The mixer is configured as a subscriber device to receive media data from any available broadcaster device through the plurality of edge devices. The mixer is configured as a broadcaster device to provide the mixed stream to the at least one origin device.

Any of the foregoing aspects can include one or more of the following features, which optionally may be further in combination with any one or more of the foregoing features. A plurality of user devices are configured as broadcaster devices. The mixer is configured to receive media data from at least some of the plurality of user devices. At least one of the user devices is configured as a subscriber device to receive the mixed stream from the mixer.

Any of the foregoing aspects can include one or more of the following features, which optionally may be further in combination with any one or more of the foregoing features. A producer computer has access to parameters used by the mixer to generate the mixed stream. The producer computer allows a user to specify or modify the parameters. The mixer has parameters to generate the mixed stream. The parameters can be modified to select different streams to be mixed. The mixed stream comprises media data and metadata about the media data in the mixed stream.

Any of the foregoing aspects can include one or more of the following features, which optionally may be further in combination with any one or more of the foregoing features. At least one node receives a live stream of an individual and a live stream from a selected one of the first plurality of participants. The system enables live interaction between the individual and the selected participant over a cluster of nodes.

Any of the foregoing aspects can include one or more of the following features, and optionally in combination with any one or more of the foregoing features. A stream manager is configured to, in response to a request from a subscriber device to access a stream of live streaming media from a broadcaster, assign the subscriber device to an edge device from among the plurality of edge devices. The computer network can include one or more relay nodes that are server computers that forward streams from origin devices to edge devices. The computer network can include one or more transcoder nodes that are server computers that transcode streams, whether original live streams from broadcaster devices or mixed streams, to multiple variants for the clients to subscribe to.

Any of the foregoing aspects can include one or more of the following features, which optionally may be further in combination with any one or more of the foregoing features. Streams that are provided to a mixer can be dynamically changed using a channel switching feature. Streams that are provided to a subscriber device can be dynamically changed using a channel switching feature. The channel switching feature allows a device to access streams that are already available in the cluster, such as from an edge device, without having to establish a new connection to subscribe to any of these streams. The feature includes a set of channels that can be switched dynamically to accept the audio and video packets of any of the published live streams. The channel switching feature can be used to change a stream with any of the other live streams. The channel switching feature eliminates a step of establishing a new connection and waiting several seconds, for example, for WebRTC to complete the signaling and ICE negotiation processes.

Any of the foregoing may be embodied as a computer system, as a component of such a computer system, as a process performed by such a computer system or a component of such a computer system, or as an article of manufacture including computer storage in which computer program code is stored and which, when processed by the processing system(s) of one or more computers, configures the processing system(s) of the one or more computers to provide such a computer system or a component of such a computer system.

The following Detailed Description references the accompanying drawings which form a part of this application, and which show, by way of illustration, specific example implementations. Other implementations may be made without departing from the scope of the disclosure.

DETAILED DESCRIPTION

Figure 1:
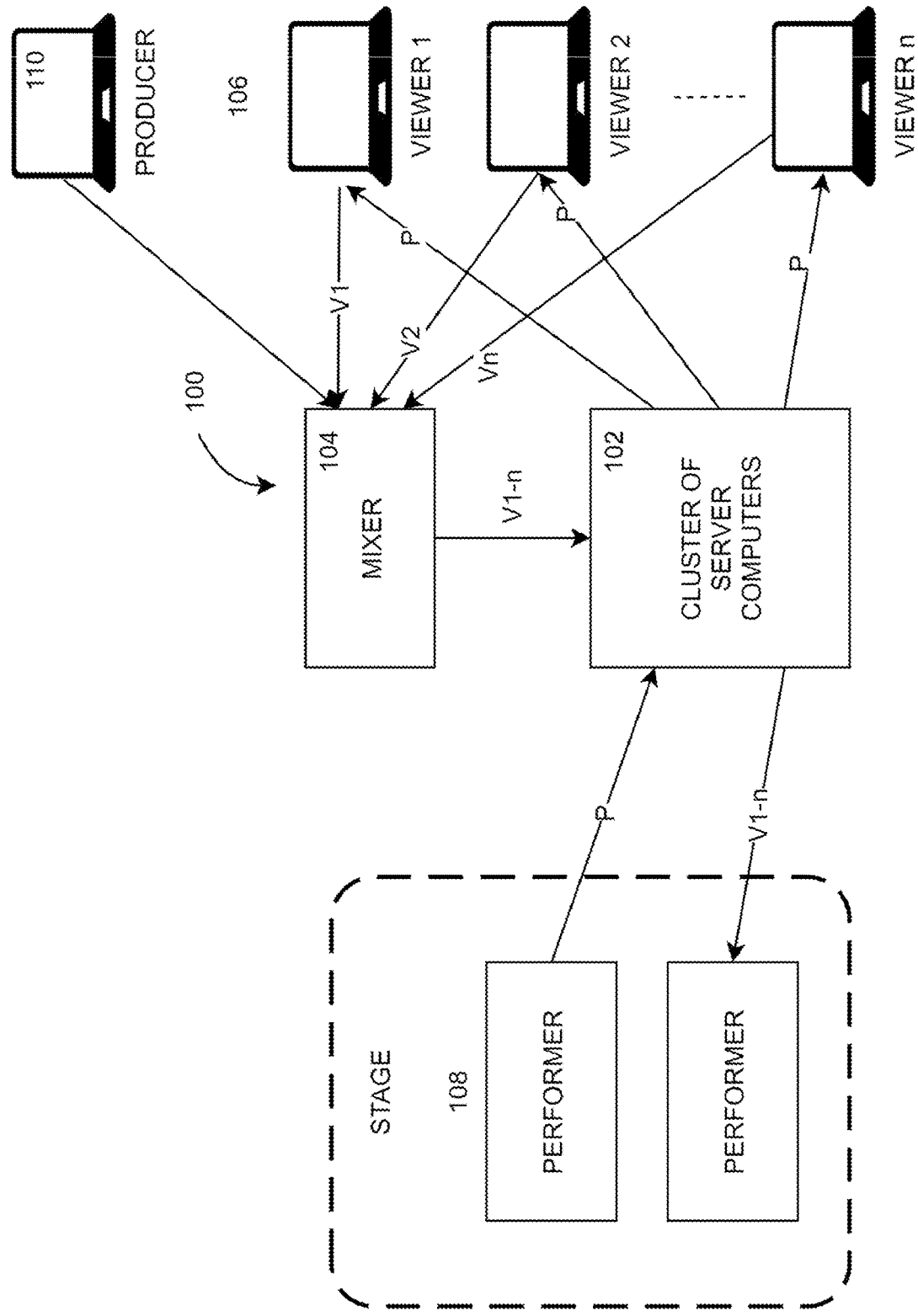
FIG. 1 is a block diagram of an example implementation of a streaming architecture for the case where the feeds will be provided through the internet, showing how the live video streams are routed between the different entities of the system.

A block diagram of an example implementation of a live media streaming system is shown in FIG. 1.

A live media streaming architecture facilitates live interaction among multiple participants, such as viewers and the stage performers for a show. A cluster (102) of server computers is responsible for generating, transmitting, and displaying a composed live stream, such as a grid, of one group of individuals, by mixing live streams from those individuals, that will allow them to interact with a stage performer or other contributors or other individuals during an event. The architecture can support receiving the live streams from anywhere in the world through the Internet. Implementations of the cluster 102 of server computers that can be modified as described herein to support such features are described in U.S. Pat. Nos. 8,019,878, 8,024,469, 8,171, 145, 8,166,181, and 8,019,867, and U.S. Published Patent Applications 2019/0320004, 2019/0320014, and 2019/0028465, which are hereby incorporated by reference.

The cluster 102 provides a distributed computer network for real-time streaming of media. Generally, the cluster allows at least one broadcaster device, which provides a stream of media, to transmit that stream of media to at least one subscriber device, which receives the stream of media. The cluster includes at least one origin device configured to establish a connection over a computer network with the at least one broadcaster device for receiving and forwarding the stream received from the at least one broadcaster device. The cluster includes at least one edge device configured to establish connections over a computer network with at least one subscriber device. The edge device receives a stream forwarded from an origin device and provides the received stream to the at least one subscriber device over an established connection. A computer network interconnects the origin devices and the edge devices for transmitting streams between the origin devices and the edge devices. The computer network can include one or more relay nodes that are server computers that forward streams from origin devices to edge devices. The computer network can include one or more transcoder nodes that are server computers that transcode streams, whether original live streams from broadcaster devices or mixed streams, to multiple variants for the clients to subscribe to. The cluster includes a stream manager that tracks streams, the broadcaster devices providing those streams, and the origin devices assigned to those broadcaster devices. The stream manager also tracks subscriber devices, and, in response to requests from subscriber devices to access streams, assigns subscribers to edge devices.

In some implementations, the cluster 102 provides an interactive experience between the groups of people, such as between viewers and stage performers of a show, where latency is minimized regardless of location by using WebRTC and a cloud based auto-scaling architecture that allows participants to publish and subscribe to live video streams with latencies below 500 milliseconds (ms). Moreover, the cluster of computers can implement Adaptive Bit Rate (ABR) to generate multiple variants with lower bit rates for each published stream, thus allowing viewers to consume the best variant that their connection supports at any time.

Media Streaming Architecture

An event such as an award ceremony or show can include participants from all over the world. This computer system will facilitate the interaction between them and others interested in the event such as press members using a mixed stream, which for some implementations is herein called a viewer grid. The mixed stream is generated from live streams from various participants. The live streams can be provided using, for example, WebRTC through a website, a RTMP or SRT encoder or as RTSP streams, or other sources.

The live streams from either performers or viewers can include any kind of media data, including but not limited to any one or more of video data, audio data, text data, image data, computer generated graphics, or any metadata about the media data, or any combination of these. Typically, video data is provided as a stream of image data, and any metadata. Typically, any other visual data is converted into a stream of image data. Similarly, any audio data is provided as a stream of audio samples, and any metadata. Any of the media data may be uncompressed or compressed form. The live stream may include one or more channels of streaming media data. Preferably, the streaming media data is provided in a standardized format.

FIG. 1 shows a block diagram of an example implementation with different entities and components of the system including the path of the live streams from both performers and viewers.

The system includes a mixer 104 which composes the live streams published by the viewers into a single live stream to create a mixed stream. In some implementations, this feature is provided using a cloud-hosted server-based mixer 104 that combines a set of live streams into one and makes the combined stream available in the cluster 102 of server computers for other clients to subscribe to. Using a server-side mixer reduces the bandwidth requirements of the mixed stream while also reducing the number of streams to what a single browser client could handle on its own. In some implementations, where a large number of streams is to be composed, multiple mixers 104 can be used to compose the mixed stream.

A mixed stream can include any combination of media data from live media streams from different sources. By way of example, two live media streams can include video data and audio data, and the resulting mixed stream can be a combination of the two video streams in a layout such as a grid composited into one output video stream plus a combination of the two audio streams, such as muting or not muting any stream. The mixed stream can be based on a selection of one or more of the media types from any live media stream. The mixed stream can be or can include audio of one or more viewers. The format of the mixed stream can be any streaming media format, and can have associated metadata. The associated metadata can be included with the mixed stream provided to subscribers of that stream.

Metadata for a mixed stream can include metadata used to define how the live streams were mixed, such as data indicating live streams and media types from those live streams used in the mix, a layout or other parameters used to combine streams, and any styling to be applied to the mixed stream. Metadata for a mixed stream can include metadata describing the mixed stream, such as coordinates of image data within the mixed stream that correspond to each live stream used, or sources, e.g., viewers or performers, associated with a live stream or a media type in the mixed stream. Such metadata allows any subscriber device or other downstream consumer of the mixed stream to process the mixed stream for presentation, such as for cropping, texturing, sub-selection of one or more streams, or other media processing.

In implementations which include video data from multiple viewers, the mixed stream may include, for example, a viewer grid including N×N viewers. A viewer grid is a composed stream created by mixing the live video streams of a set of viewers into an N×N or N×M grid layout, where the grid could have any dimensions like 3×3, 5×4, 30,000× 30,000 or any other integer value for N and M. The composed stream can be made available to a broadcaster for use in a main broadcast. The mixed stream can be or can include audio of one or more viewers and these audio channels can be dynamically added or removed in real time from the composed stream. Where the event is a performance and the viewers are fans of the performer, we can refer to the viewer grid as a "Fan Wall."

The viewer grid can be created from a large number of viewers, such as a viewer grid that includes 1000 or more members. For example, each mixer can create a viewer grid with a 2×2 or 3×3 layout. For composing 49 streams, using a 2×2 layout will use 3 mixing levels: the first one composes 4 streams, the second one produces a viewer grid with 16 streams, and the last one produces a viewer grid with 64 streams. On the other hand, using a 3×3 layout uses two mixing levels: the first one composes 9 live streams and the second one produces a viewer grid with 81 streams. A final composition may have some empty boxes in a viewer grid. In some implementations, these empty boxes may be removed at the time of display by cropping the composed stream.

In some implementations, the mixer 104 can be implemented as a node type in the cluster 102 of computers or as an independent node. Each mixer 104 can be hosted on a cloud compute instance and managed by an auto scaling solution of the cluster 102 of computers or managed manually by a user. Multiple layers of mixers 104 may be used depending on the number of streams to compose. In general, in some implementations, the mixer 104 can be treated as a subscriber device that subscribes to an edge device to receive streams that will be mixed. Further, the mixer 104 can be treated as a publisher device which connects with an origin device and provides an output stream to which other devices can subscribe.

In some implementations, the mixer can integrate the Chromium Embedded Framework (CEF). CEF is a headless browser that can be used to execute HTML and JavaScript code on a server computer. In some implementations, the mixer 104 can be implemented to load two web pages in a browser to subscribe to the live streams, organize them in a layout and publish the layout for the mixed stream using a screen sharing or screen ripping functionality.

When multiple mixers 104 are used, in some implementations each mixer 104 in each layer can load a page that subscribes to multiple live streams, and combine the live streams into a custom HTML5 layout, and publish the resulting mixed stream to another mixer 104 in a next layer. Finally, the last layer has one mixer 104 that produces the resulting mixed stream that it publishes to the cluster 102 of server computers for the clients to subscribe to.

Also shown in FIG. 1 are viewer computers (collectively or individually 106) and performer computers (collectively or individually 108). A viewer may have one or more viewer computers 106. A performer may have one or more performer computers 108. In some instances, a viewer may receive a stream (e.g., stream P) through one viewer computer 106, but provide a stream (e.g., stream V1) through a separate viewer computer 106. In some instances, a performer may provide a stream (e.g., stream P) through one performer computer 108, but receive a stream (e.g., stream V1-N, such as a mixed stream) through a separate performer computer 108. In some events, the roles of performer and viewer may be blurred.

As shown in FIG. 1, the performer computer 108 provides stream P to the cluster 102. In this instance, the performer computer can be considered a publisher or broadcaster device that connects to an origin device in the cluster 102. In this instance, viewer computers 106 subscribe to the stream P and are connected to an edge device in the cluster 102.

Viewers also may provide streams (e.g., V1, V2, . . . , VN). As shown in FIG. 1, these streams are provided to a mixer 104. In some implementations, the mixer can be implemented as a type of origin device, to which the stream manager assigns viewer streams, and for which the output is treated as a stream to which subscriber devices can subscribe. In some implementations, the mixer can be a subscriber device that subscribes to viewer streams and receives them through an edge device. In this case the viewer computers providing viewer streams can be considered a publisher or broadcaster device and are assigned to origin devices. In this case, the mixer also can be a publisher or broadcaster device that connects to an origin device to provide the mixed stream to which subscriber devices can subscribe. In some implementations, the mixer can receive live streams directly from any device. In some implementations, the mixer can provide mixed streams directly to any device.

The output of the mixer, whether the mixer is a publisher or broadcaster device, subscriber device, or a type of origin device or edge device, or independent node, is a mixed stream to which other devices can subscribe, and receive the output through an edge device in the cluster 102. Thus, a performer computer 108 also can act as a subscriber device to receive the mixed stream output from mixer 104 through the cluster 102.

Figure 2:
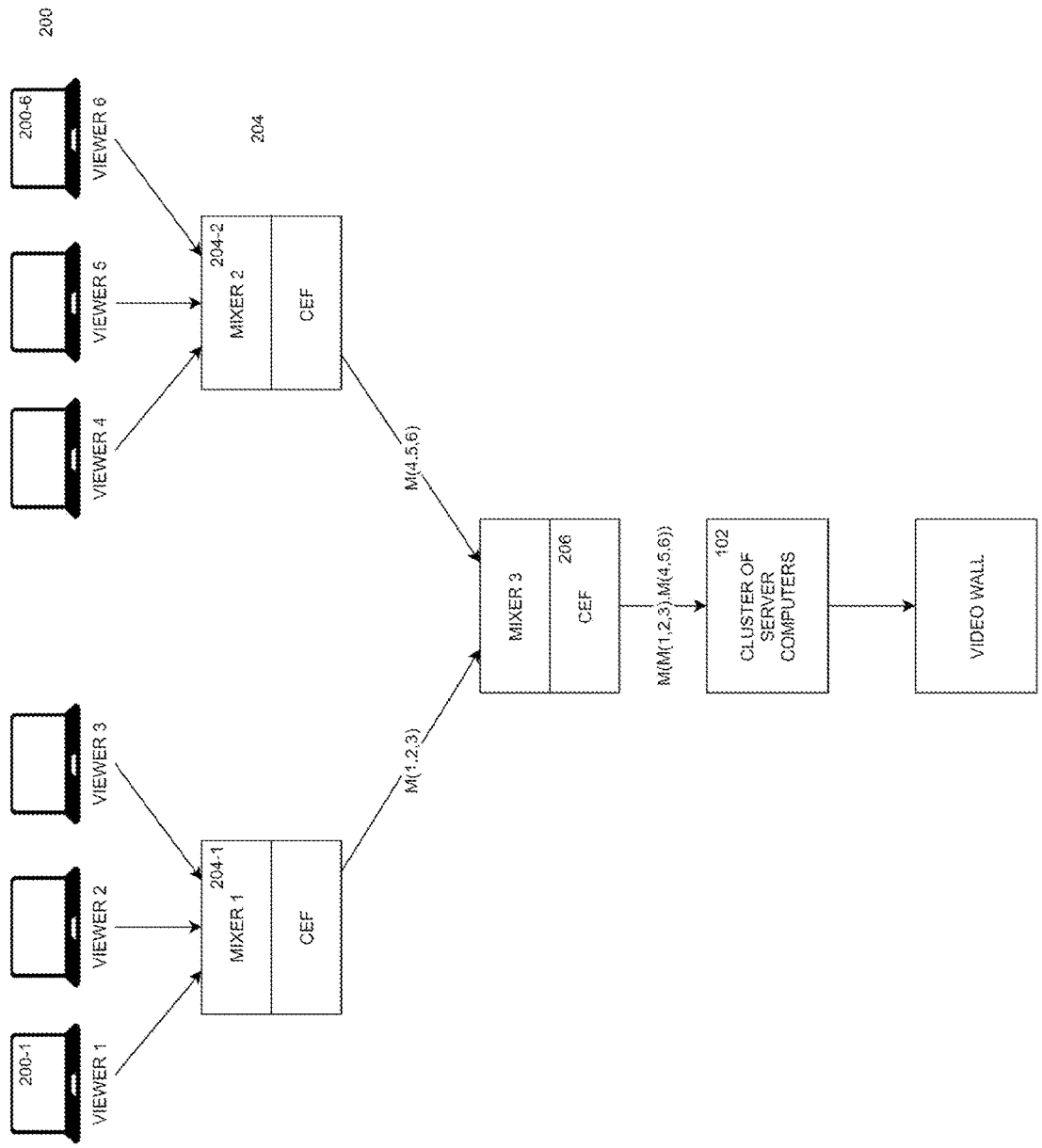
FIG. 2 is a block diagram of an example implementation of a CEF based server-side mixer solution that uses two layers to create a single stream from six input streams.

A block diagram of an example implementation of an architecture with CEF based mixers with two mixing layers is shown in FIG. 2.

FIG. 2 shows an example implementation of how the streams from two sets of three viewer computers (collectively, 200; individually 200-1 to 200-6) are mixed into a single steam for the viewer grid using CEF-based Mixers (collectively, 204; individually, 204-1 and 204-2). To show the overall architecture in a simplified manner it is assumed that each mixer 204-1, 204-2 can compose at most three input live streams. With these assumptions, each mixer 204-1, 204-2 will use its local CEF instance to subscribe to the live streams of three viewer computers. Mixer 204-1 is shown as receiving the live streams from viewer computers 200-1, 200-2, and 200-3; Mixer 204-2 is shown as receiving the live streams from viewer computers 200-4, 200-5, and 200-6. Each mixer 204 pre-mixes the received live streams into a single video stream, and thus generating the streams M(1,2,3) and M(4,5,6). the mixers 204 publish their respective streams to another Mixer 206 that will mix the pre-mixed streams M(1,2,3) and M(4,5,6) into a final mixed stream M(M(1,2,3), M(4,5,6)). After the final mixed stream is generated, the final mixed stream is published to the cluster 102 of computers where it can be transcoded to multiple variants for the clients to subscribe to. Using this method it is possible to mix a large number of streams with a minimal number of hops between the mixers 204, 206.

Figure 4:
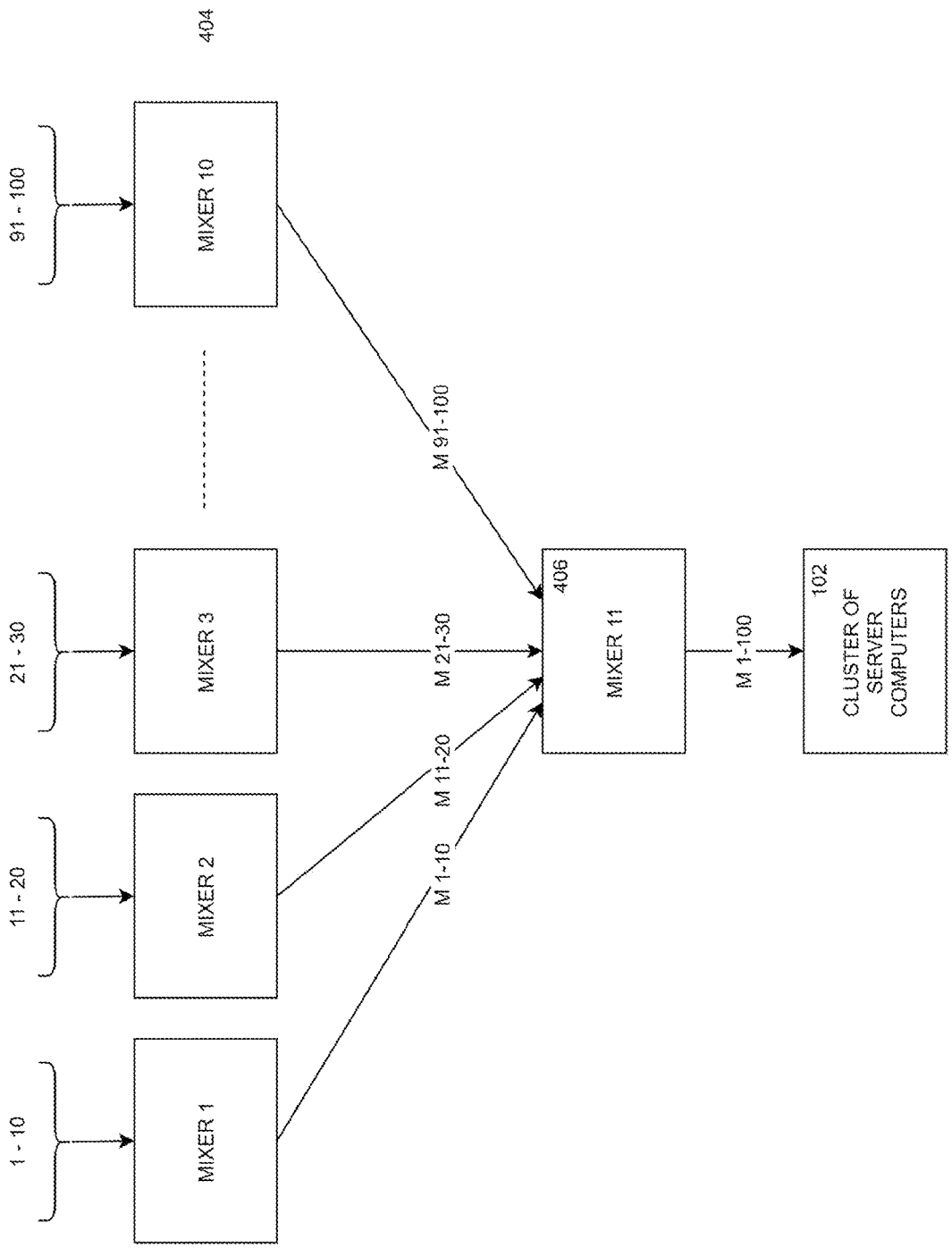
FIG. 4 is a block diagram of an example implementation showing how 100 streams can be mixed into one using two layers of mixers.

A diagram of an example implementation of such a mixing tree is shown in FIG. 4. Assuming that one hundred streams are mixed and that the instances of the mixers 404 each can ingest ten streams, then a set of ten mixers 404 can handle the one hundred streams, with each mixer 404 handling ten streams. The outputs from the set of mixers 404 are combined into the final mixed stream that can be presented in a custom layout. Specifically, another mixer 406 can acquire the ten pre-mixed streams of the previous mixers 404 and create the final mixed stream that will include all 100 streams. The final mixed stream is provided to the cluster 102 of server computers. The parameters used by each mixer 404 can be different among the mixers.

Figure 3:
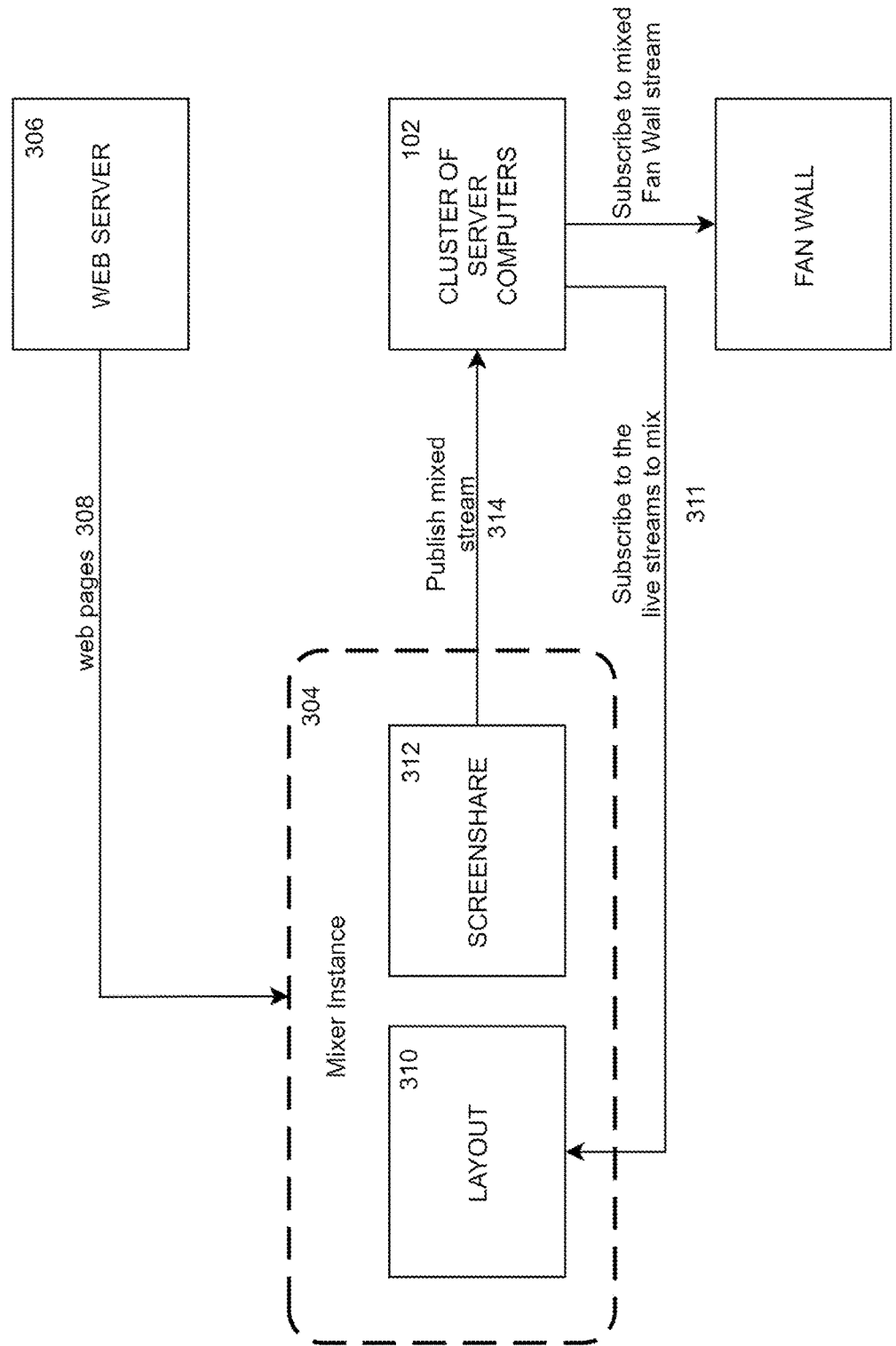
FIG. 3 is a block diagram of a browser-based server-side mixer solution that uses one mixer to create a single stream from multiple input streams.

A block diagram of an example implementation of an architecture that uses a browser-based solution with only one mixing layer is shown in FIG. 3.

FIG. 3 shows an example implementation of how a set of streams are mixed into a single stream for the viewer grid using browser-based mixers 304. To show the overall architecture in a simplified manner it is assumed that one mixer 304 can compose all input live streams. With these assumptions, the mixer 304 loads from a web server 306 two web pages (collectively 308). One web page, when processed by the mixer 304, implements a layout module 310 that subscribes to the live streams 311 from the cluster 102 to mix and organizes them in a layout. The other web page, when processed by the mixer 304, implements a screen sharing module 312, which uses a screen sharing functionality to publish, back to the cluster 102, the resulting mixed stream 314 with the layout and live stream composition generated by the other page 310. The mixed live stream is published using a configurable aspect ratio to the cluster 102 of computers where it can be transcoded to multiple variants for the clients to subscribe to.

In the foregoing example implementations, each mixer (e.g., 204 in FIG. 2, 304 in FIG. 3, 404 in FIG. 4) composes a set of live streams according to a custom layout that can be provided as HTML5/JavaScript. The changes in the layout can be directed by messages sent using WebSockets. In particular, the mixer can provision its local CEF instance or browser with the webpages to load and the Web Socket server endpoint, and the webpages connect to the Web Socket endpoint to receive the streams to compose and the layout data. The data, which can be dynamically updated, specifies at least 1. the streams the page will subscribe to, 2. the layout or other parameters to combine streams, and 3. any styling to be applied to the mixed stream. As an example, the layout can be organized as a static grid.

The selection of streams, layout or other parameters used to combine them, or any styling or other processing parameters, or any combination of these, can be controlled through one or more producer computers 110 (FIG. 1). For example, such control can be provided through a browser-based console that accesses either a server hosting the webpages or other data loaded by the mixer, or that accesses the mixer, to allow an individual (e.g., a producer of an event) to add or remove live streams from the mixer, change the layout of the viewer grid or other parameters for mixing the streams, or change styling of the viewer grid or other parameters of the mixed stream. It should be noted that when multiple mixers are used, the layout can be specified for each mixer and organized so that the final layer generates the expected mixed stream. This strategy creates an easy to use and highly dynamic solution that allows individuals such as event producers to mix streams into any layout that can be changed at any time during the live event.

A producer computer 110 can be configured to access the source used by mixers to access parameters for a mix. For example, in the foregoing implementations, the producer computer can access the Web Socket server that provides the mixers with those parameters. A producer computer can be part of the cluster, or an independent node that can access the cluster, or a type of broadcaster or subscriber device. The Web Socket server or other source of the mixing parameters can be configured as a source of information to which producer computers can subscribe and publish, and to which mixers can subscribe.

Server-Side Mixer Logic

The number of streams to include in a mixed stream, such as a viewer grid, affects the number of mixers (e.g., 104, 204, 304, 404) that are used to create the mixed stream. In some implementations, the cluster 102 includes at least one node type for a mixer and control logic for that node type is added to the stream managers, which are a set of instances that manage the operations of the cluster 102 of computers. In some implementations, the control logic can include life cycle, launch and scaling policies together with the provisioning and integration of a mixer with the logic for managing the rest of the cluster 102 of computers. A Stream Manager API can include a mechanism to inform a Stream Manager about the number of streams that will be in a composition, the locations of the publishers and the respective Web Socket server to which each Mixer should connect. With this information, the Stream Manager can determine the mixers to use. Each mixer can be provisioned with a Web Socket endpoint and a node in the cluster 102 of computers to which the resulting mixed stream is published by the mixer, which can be a transcoder or origin node in the cluster for the final composite stream, or another mixer for pre-mixed streams.

In some implementations (e.g., FIGS. 2 and 4), each mixer generates a page for a local CEF instance that connects to the WebSocket server endpoint to receive the list of stream names to which it is to subscribe and optionally other parameters. Such other parameters can include logic to process and apply a layout to the mixed stream.

In some implementations (e.g., FIG. 3), each mixer loads two web pages, one to subscribe to the live streams and organize them in a layout, and another web page to publish a screen share stream with the resulting composition. The web pages can be provisioned with a Web Socket endpoint to which they should connect.

In any of these implementations, during the initialization of a Web Socket connection, each page can communicate its identifier to the mixer, which the mixer can provide to producer computers or other back end service or the stream manager, to allow individuals to identify the mixers and their pages, provide them with the list of stream names that they will be mixing, and generate a viewer grid or other mixing parameters, for each of them that will result in the expected final mixed stream.

The Web Socket server can provide an API for producer computers, to allow software on the producer computer to allow individuals to add or switch in new streams to an existing composition, remove streams from the mix, modify the arrangement of the streams, or modify other aspects of the mix.

In some implementations, the API can include commands allowing a mix, or components of the mix, such as the set of live streams used in the mix, to be created, read, updated, or deleted. For example, data defining components of a mix, such as the list of streams, can include a name for the mix, and a list of stream names. Data defining a mix can include any one or more of: a unique identifier of a mixer, an identifier of a webpage for a mixer to load, a name to be used to publish the mixed stream, any size, aspect ratio, coordinates, etc., for any combination of visual media in the mix, or data indicative of any parameters for the output stream, such as sample rates and resolutions, or any indications of audio data to be muted or unmuted. Upon any change, the API can include transmission of messages specifying any changes to any device such as a mixer that is subscribed to receive messages from the Web Socket.

When adding new streams, the mixer will subscribe to the new streams to include them in the composition. Similarly, when removing streams, the mixer can unsubscribe to the streams that are being removed. Alternatively, the mixer can remain subscribed to, but not use the media of, a stream to allow faster switching if that stream is later added back into the mix.

Channel Switching Feature

The streams that are composed or mixed into the viewer grid can be dynamically changed using a channel switching feature. The channel switching feature allows the system to compose live streams that are already available in the cluster without having to establish a new connection to subscribe to any of these streams. The feature includes a set of channels that can be switched dynamically to accept the audio and video packets of any of the published live streams. As an example, a mixer is selected for the composition of two live streams and it is provisioned with an HTML5 page that interfaces with an edge server in the cluster 102 and creates two switchable channels, one for stream A and another for stream B. Subsequently, the mixer prompts the edge server to push the packets of those streams into the switchable channels which are composed into a custom layout on the mixer and the resulting stream is published to the cluster 102 where other devices can subscribe to it. At any time the channel switching feature can be used to change stream A or stream B with any of the other live streams. The channel switching solution can also be used to create more channels than needed so that if a new stream is added to the composition it will not be necessary to establish a new connection and wait for 5 seconds or more for WebRTC to complete the signaling and ICE negotiation processes.

Figure 5:
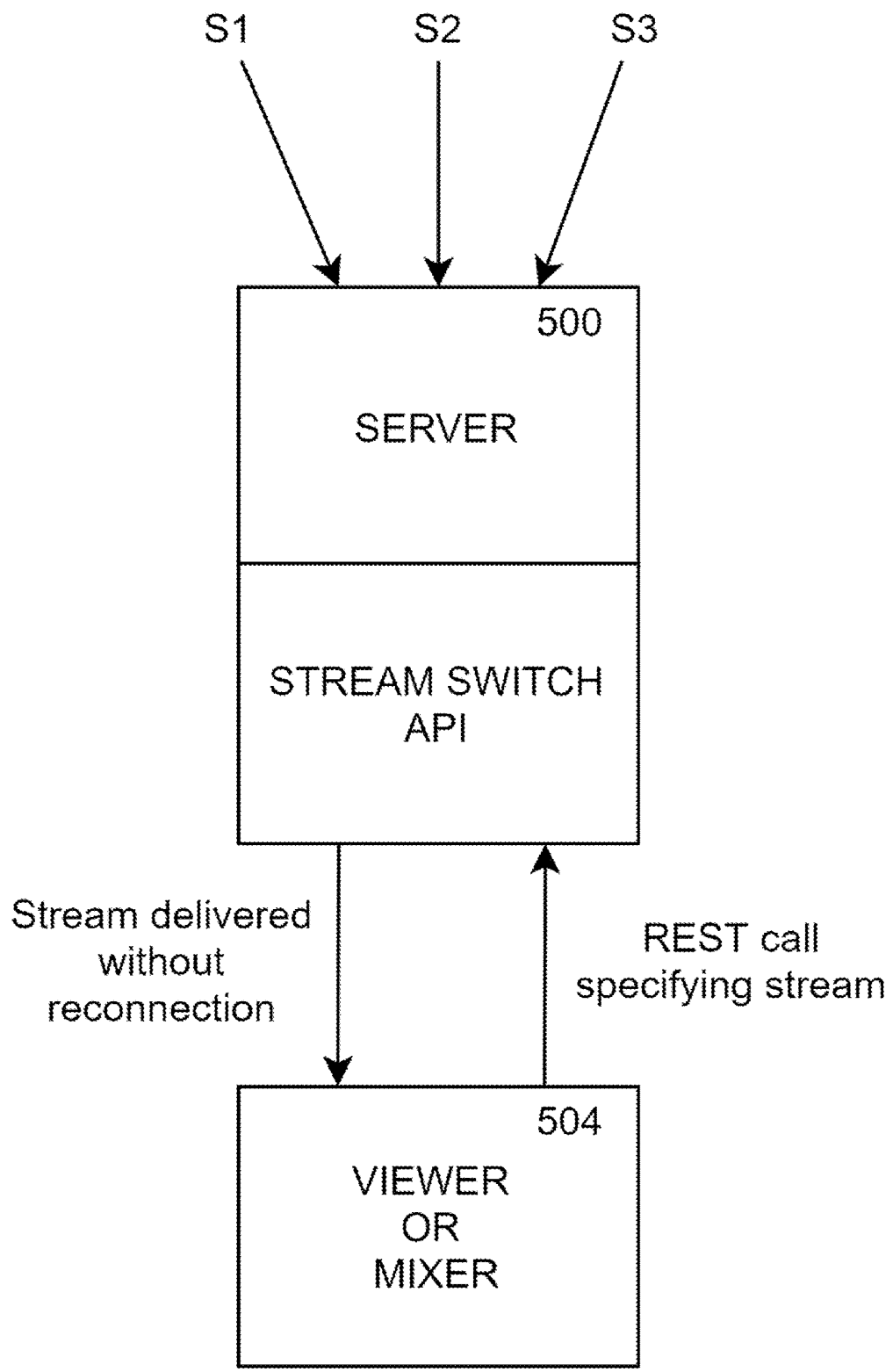
FIG. 5 is a block diagram of an example implementation of a channel switching feature showing how a client can request packets of a different stream without establishing a new connection.

In some implementations, the channel switching feature can be implemented as a server-side web app that allows for real time switching of streams without the need to reconnect the client. A diagram of an example implementation of this feature is shown in FIG. 5. A server computer 500 in the cluster has live streams (e.g., S1, S2, S3, and so on) that are already available in the cluster and received by the server computer. A web app running on the server computer 500 provides a REST API that can be called by the webpage running on the mixer 504 to create or remove channels and specify which stream should be delivered to each of the channels. In this way, producers can control the live streams that a mixer is subscribing to and switch them as needed, whether by selecting different streams or selecting different channels for the different streams.

Figure 6:
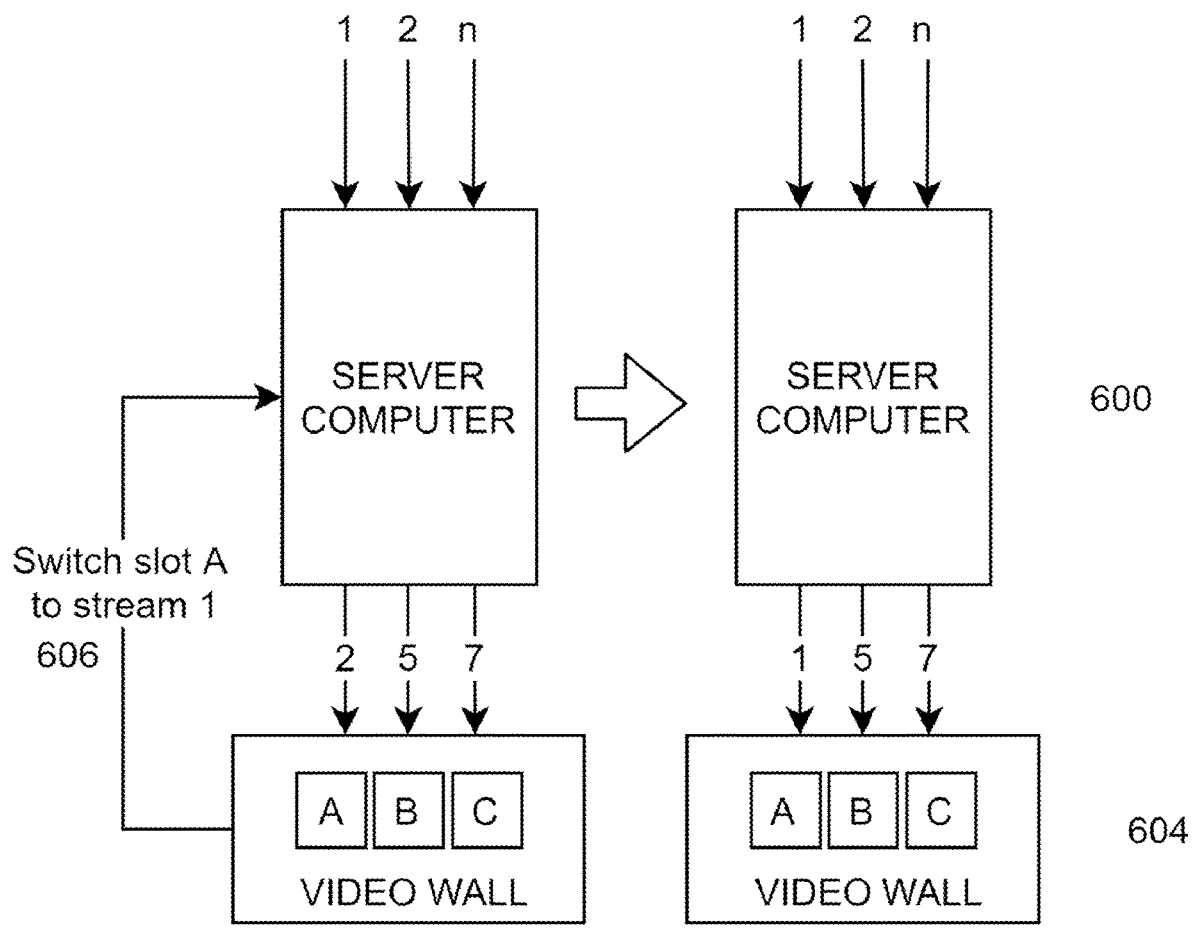
FIG. 6 is a block diagram of an example implementation showing the state of the client page before and after a channel switching call to an edge node.

By way of example, FIG. 6 shows a diagram with the state of a mixer 604 before and after making a call (606) to a server computer 600 to switch a stream. For simplicity, the page output by the mixer 604 is assumed to have only 3 stream slots. Before the call, FIG. 6 left, the page had the streams 2, 5 and 7 in slots A, B and C, respectively. After the mixer 604 makes a call 606 to the server computer 600, the stream in slot A has been switched, as shown at FIG. 6 right, to stream 1.

Similar functionality can be supported for any subscriber device. Thus, subscribers have the ability to switch streams in two different ways. First we have a 'per-session' switch which allows a WebRTC subscriber to switch to another existing live stream without reconnecting. Optionally the switch can be 'soft' by waiting on a key video frame, or 'hard', which will force the switch immediately. When forcing the switch, audio can continue uninterrupted but video may potentially pause or freeze until the next keyframe arrives. When the new stream is unpublished, the subscriber session can end as normal. When clustered, the API call goes to the edge via HTML5 SDK. The second type of switching uses interstitial config and reroutes a source live stream into a target one as the broadcast source and changes the stream for all subscribers. In this way, all subscribers watching the target stream will now receive the video of the source stream. If the source stream is unpublished, the original target stream will resume. This type of switch can be used for constructing caller-lines or video busses and fail-safe live sessions. When clustered, REST calls can go to the origin.

Authentication

In some implementations, round trip authentication (RTA) allows the system to validate incoming publish or subscribe requests against an authentication server. If the request is validated, then the client is allowed to continue with its action of either publishing a stream or subscribing to a published stream. The availability of RTA allows developers to create per-stream authentication policies to authenticate each publish and subscribe request.

Figure 7:
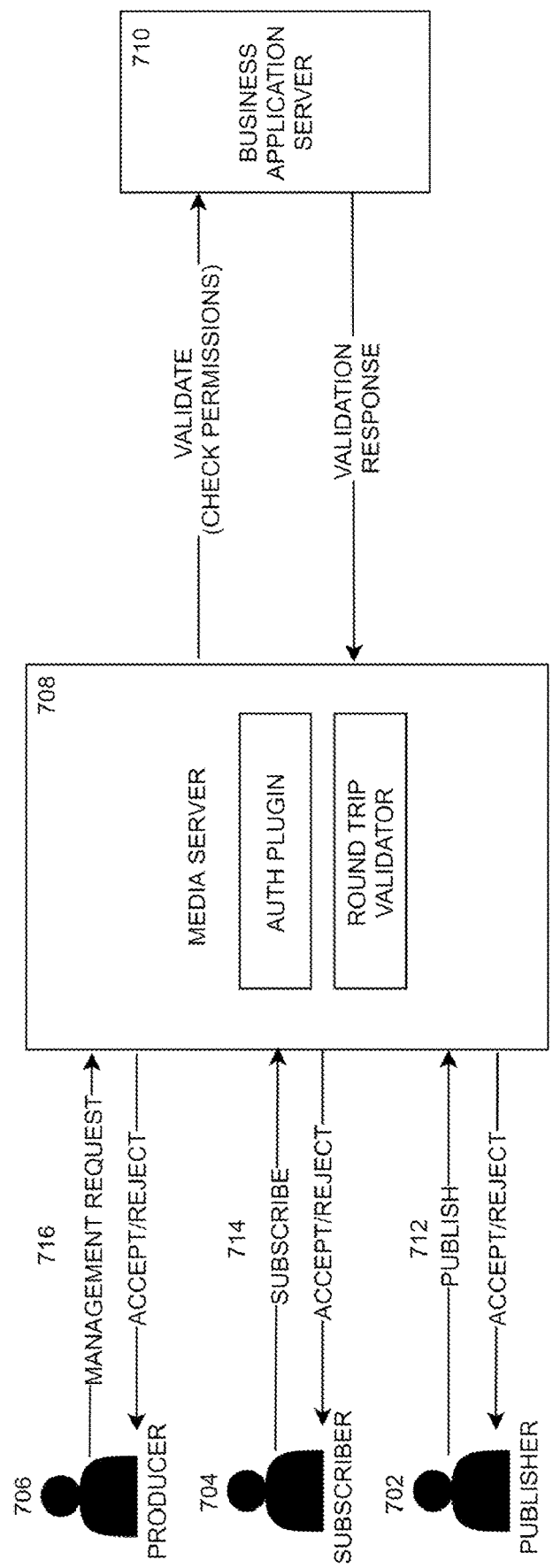
FIG. 7 is a block diagram of an example implementation of round-trip authentication.

A diagram of an example implementation of the process is shown in FIG. 7. Clients that are allowed to publish or to watch live streams, and producers that are allowed to manage aspects of an event, are provided with access credentials, such as a username, password and optionally a token. A token can be, for example, any string or reference to, or data representing, and object, such as a JSON object. These access credentials can be managed, for example, by an entity who controls the content or the event. For example, the entity may control a business application server (710 in FIG. 7) which stores and validates access credentials. In some implementations, a decryption key may be provided if the system is configured to use the end-to-end encryption.

Through a respective client computer, a client, e.g., a publisher 702 or subscriber 704, a producer 706, makes a publish request (712) or subscribe request (714) or a management request (716) to a media server 708 in the system, providing access credentials. The media server receives the request from the client computer and validates the request. For example, in some implementations, the media server 708 can make a call to a REST endpoint on a business application server 710 with the data that it received from the client computer. The business application server 710 validates the data received in the request, to determine if the client has the permissions to continue with its action or not and provides a validation response back to the media server. The media server 708 determines, based on the response from the application server, whether to accept or deny the request (702, 704, 706) from the client. If the request is accepted, then the client computer is allowed to either publish or subscribe to a video stream, or otherwise manage the event. In case of an end-to-end encrypted stream, the client uses the decryption key it received to decrypt the stream.

In the example implementation shown in FIG. 7, the system can authenticate clients without access to the business rules that determine who is authenticated. Therefore, the cluster that distributes content and the business application server 710 can be independently controlled and operated from each other, such as by separate entities using separate computer systems. The entity that wishes to control access to the system and the content, for publishing, subscribing, or production management, or any combination of these, is able to enforce and update custom authentication rules as needed just by updating the application server.

This process also allows creation of per-stream authentication policies to control the access to each stream and allow only a subset of the users that can access the cluster to watch each stream. Additionally, when a stream is unpublished, i.e., the publisher removes the stream from access, the stream manager can send a message to the business application server 710, which can trigger any additional back-end processes.

Stream Recording

The cluster can record any of the live streams including the composed ones. In some implementations, the live streams published from viewer computers can be recorded independently to allow any third party that has access to them to compose them as preferred while also being able to add any custom branding or overlays. In some implementations, the published live streams or composed streams generated by the cluster may not be recorded.

The cluster can support a variety of formats for stream recording. For example, the cluster can perform stream recording in fly or HLS formats and it can use the ffmpeg codec to transcode from FLV to MP4. Moreover, using a post processor, recordings can be automatically uploaded to a cloud-based distribution service after they are ready.

Servers in the cluster can be instructed to record a stream by the client side by configuring a stream mode to record or append. Alternatively, a server-side configuration flag can be set to force the recording of a stream. The cluster generates a recording for each publishing session that starts as soon as the stream is published and terminates once the stream is unpublished. Each publishing session is treated independently of the previous ones, and thus if a publisher disconnects for any reason and the same stream is re-published immediately, the new recording will either overwrite the previous one if using the record mode or be appended to any existing one with the same name if using append.

A problem may arise when recording the live streams in append mode in an autoscaling environment that uses multiple transcoder or origin nodes. The recordings are generated on the transcoders or origins, but typically an autoscaling environment does not guarantee that, if the same stream is republished, it will be using the same origin or transcoder that it was using before. The use of a different origin or transcoder could break the append mode. The autoscaling environment also typically does not guarantee that the same transcoder or origin are always used for the same stream name because nodes may reach their streaming capacity or they may be replaced in case of failure. Therefore, in implementations in which it is desired to have complete recordings even if publishers disconnect in an autoscaling environment using an append mode, the cluster can include a shared file system that is shared across the transcoder or origin nodes that can record. Using a shared file system allows all of them to write the recordings in the same shared folder, and thus provide access to the complete set of recordings.

In some implementations, the shared storage can be implemented using NFS to create a shared file system across transcoder and origin nodes. In some implementations, such as using Amazon Web Services and its Elastic File System (EFS), the shared file system can be implemented using EFS.

Deployment

Figure 8:
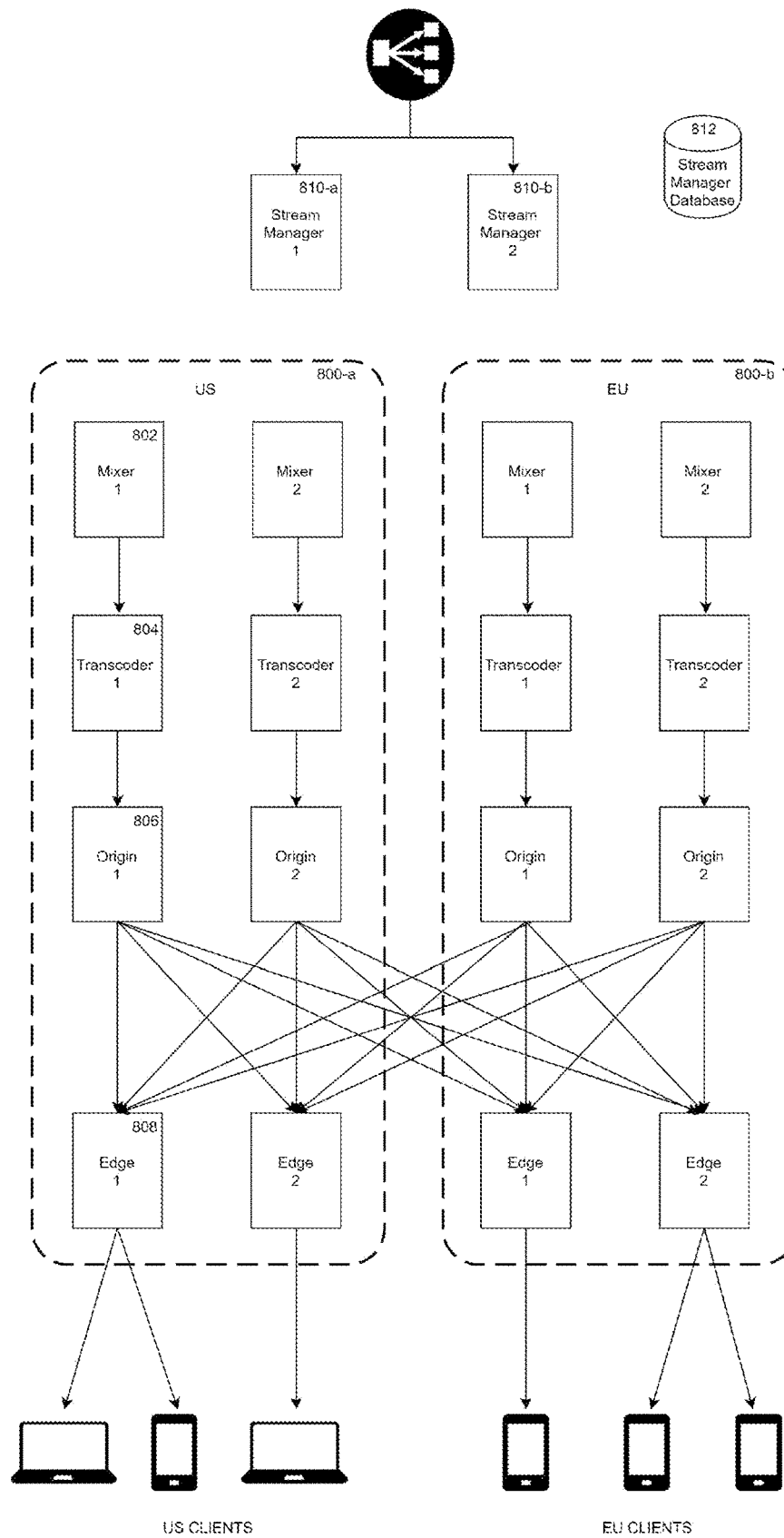
FIG. 8 is a block diagram of the initial state of a deployment with clusters in the US East and US West regions, in an example implementation.

A set of clusters can be deployed in different regions. FIG. 8 shows a diagram with the initial state of a typical high availability deployment with a cluster 800a in the US East and US West regions and a cluster 800b in a Europe region (collectively, clusters 800). A cluster includes one or more mixers 802, one or more transcoder nodes 804, one or more origin nodes 806, and one or more edge nodes 808. Live streams are published to the transcoder nodes or origin nodes, and delivered through edge nodes to the mixers. When publishing to a transcoder node, a live stream is transcoded into multiple variants that are made available to the origin nodes and the edge nodes in the cluster. When publishing to an origin node, the streams are made available with the same quality to the edge nodes. The mixers generate the mixed streams that can be published to a transcoder to generate multiple variants with different quality levels of the same stream which are made available to the origin nodes and edge nodes. For global deployments, each region, e.g., 800a and 800b, can be initialized with a cluster with mixers, transcoders, origins and edges and the streams are propagated across regions by having each origin connect to all edges across the regions. In this way, every edge will have a copy of every live stream that it will make available to its subscribers. Having a copy of the live streams on each edge adds redundancy to the system because if any of the edge instances failed, a viewer can quickly connect to another one to continue watching the live streams.

Each deployment can include a set of load balanced Stream Managers 810a, 810b that control the set of clusters and spin up or down new instances of nodes dynamically based on the current load or scheduled events and a database 812 to store the network's state. The Stream Managers act as a traffic manager, which can be implemented through use of a REST API for example.

Figure 9:
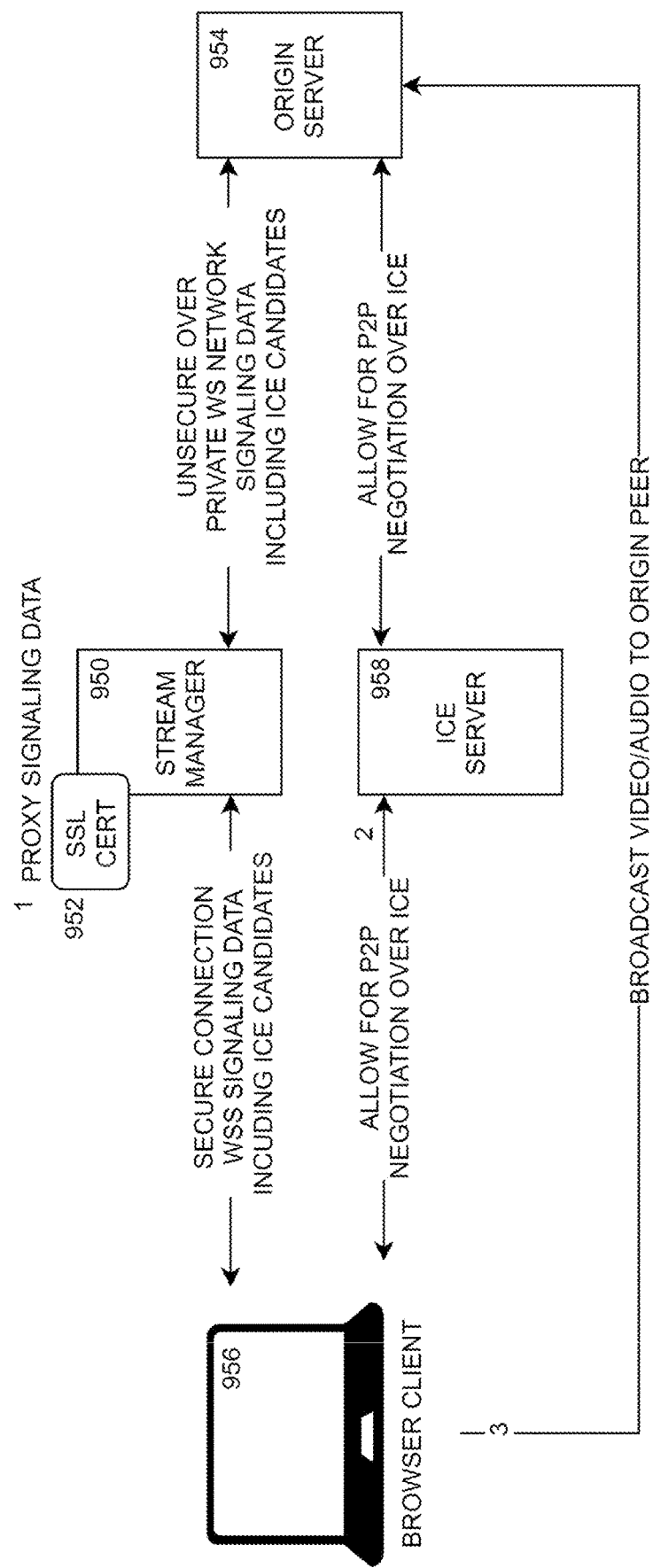
FIG. 9 is a block diagram showing how a stream manager proxies the SSL connection between a client and an origin node in an example implementation.

The stream managers also can act as a signaling server proxying the web socket calls down to the other nodes when connecting, such as shown in FIG. 9. In such an implementation, a Stream Manager 950 manages an SSL certificate 952 and has a domain associated with it. Mixers, performer computers, viewer computers, and producer computers, when treated as broadcaster or subscriber devices, can all access the origin and edge devices through such a proxy. An implementation of a cluster using a proxy is described in U.S. Patent Publication 2019/0028465, which is hereby incorporated by reference.

Figure 10:
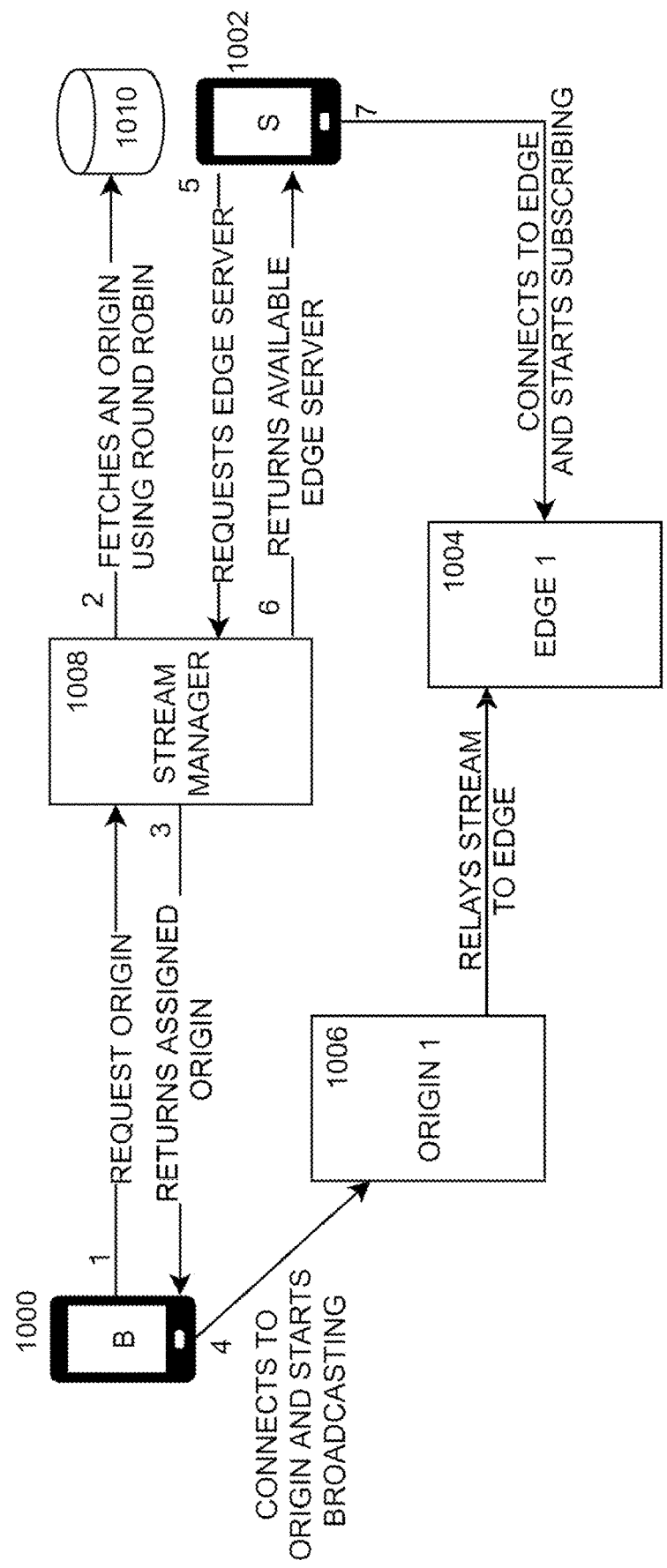
FIG. 10 is a block diagram showing how a publisher receives an indication of an origin to broadcast to and how a subscriber receives an indication of an edge to subscribe to. in an example implementation.

For clusters that do not include transcoders, the publishers 1000 broadcast to an origin node 1006 that is provided by the stream manager 1008. The stream manager may access a database 1010 that tracks information about the instances of origin nodes and edge nodes. On the other hand, when subscribing to a stream, a client computer 1002 requests an edge node 1004 and receives the live stream from it. FIG. 10 shows a sequence diagram of the process followed by a publisher 1000 to receive the information about an origin node 1006 to publish to, and followed by a subscriber 1002 to receive the information about an edge node 1004 to subscribe to. Mixers, performer computers, viewer computers, and producer computers, when treated as broadcaster or subscriber devices, can all request and be connected to the origin and edge devices, in some cases using a proxy (typically performer computers and viewer computers) and directly in other cases (such as mixers), in the same way as other broadcaster and subscriber devices.

Each instance of a node in a deployment can be implemented as a virtual machine, running on a server computer that provided many virtual machines, which is controlled by the stream managers. The stream managers can use a Terraform provider, which abstracts the commands issued by the stream managers to interface and implement the specific network's APIs to run the commands. The total number of mixers, transcoder nodes, origin nodes, relay nodes, and edge nodes used in a cluster depends on the number, protocol and video quality of broadcast streams and subscribers and the capabilities of each machine used to implement those nodes, such as virtual machines on a cloud-hosted set of server computers.

Backup Deployment

Some embodiments may need two independent ways to access the live stream so that if any was not available for any reason, the other one could be used as backup. One way to address this is to deploy two separate environments and use one for backup. The Clusters in the deployments will be exact replicas. The deployments may target different cloud platforms for additional independence. The live streams are published to both environments and any client will be able to access them from either by preferring the main deployment and switching to the backup only if necessary.

Figure 11:
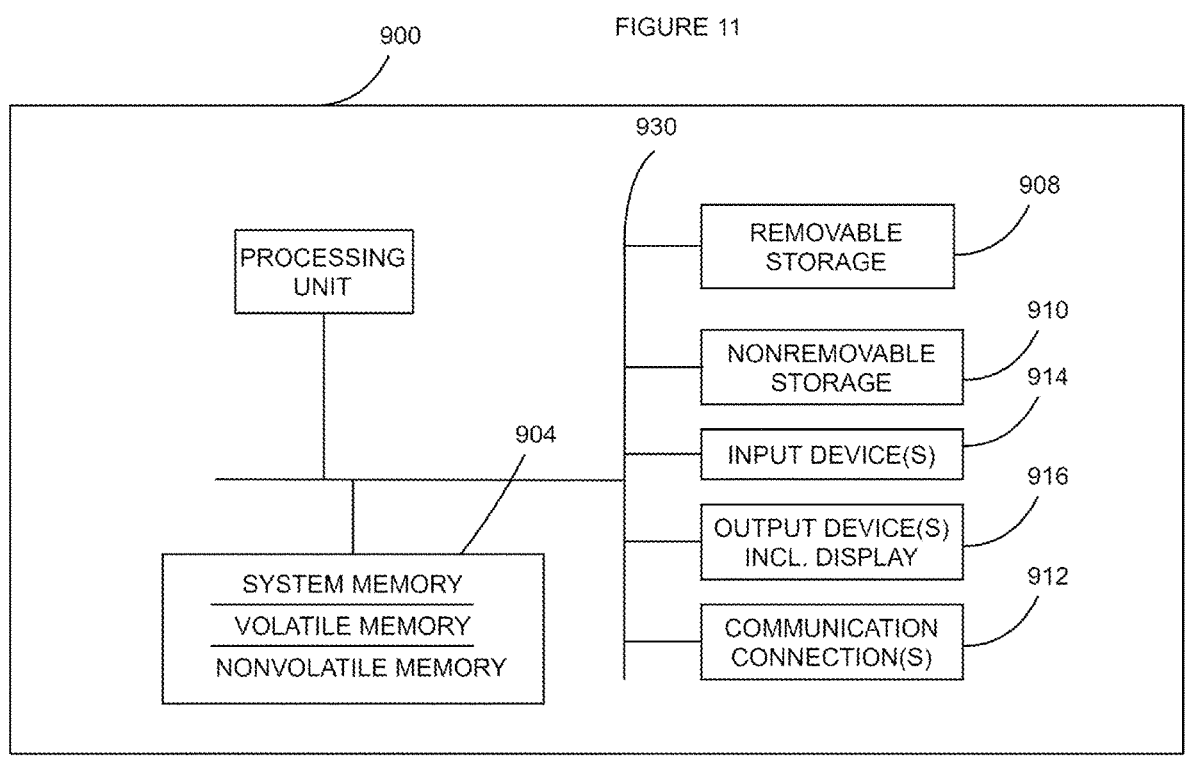
FIG. 11 illustrates a block diagram of a general-purpose computer.

Having now described several example implementations, FIG. 11 illustrates an example of a general-purpose computing device. Such a computing device or computer can be used to implement any computer, node, or device in the foregoing system, including but not limited to any user's device, client device, performer computer (also called a performer device), viewer computer (also called a viewer device), edge (also called an edge node, edge device, or edge computer), relay (also called a relay node, relay device, or relay computer), origin (also called an origin node, origin device, or origin computer), stream manager, mixer (also called a mixer node), media server, transcoder, application server, or other computer system, computer, node, or device as described herein. This is only one example of a computer and is not intended to suggest any limitation as to the scope of use or functionality of such a computer. The system described above can be implemented in one or more computer programs executed on one or more such computers or devices as shown in FIG. 11.

FIG. 11 is a block diagram of a general-purpose computer which processes computer program code using a processing system. Computer programs on a general-purpose computer typically include an operating system and applications. The operating system is a computer program running on the computer that manages and controls access to various resources of the computer by the applications and by the operating system, including controlling execution and scheduling of computer programs. The various resources typically include memory, storage, communication interfaces, input devices, and output devices. Management of such resources by the operating typically includes processing inputs from those resources.

Examples of such general-purpose computers include, but are not limited to, larger computer systems such as server computers, database computers, desktop computers, laptop and notebook computers, as well as mobile or handheld computing devices, such as a tablet computer, handheld computer, smart phone, media player, personal data assistant, audio or video recorder, or wearable computing device.

With reference to FIG. 11, an example computer 900 comprises a processing system including at least one processing unit 902 and a memory 904. The computer can have multiple processing units 902 and multiple devices implementing the memory 904. A processing unit 902 can include one or more processing cores (not shown) that operate independently of each other. Additional co-processing units, such as graphics processing unit 920, also can be present in the computer. The memory 904 may include volatile devices (such as dynamic random-access memory (DRAM) or other random access memory device), and non-volatile devices (such as a read-only memory, flash memory, and the like) or some combination of the two, and optionally including any memory available in a processing device. Other memory such as dedicated memory or registers also can reside in a processing unit. This configuration of memory is illustrated in FIG. 11 by dashed line 904. The computer 900 may include additional storage (removable or non-removable) including, but not limited to, magnetically recorded or optically-recorded disks or tape. Such additional storage is illustrated in FIG. 11 by removable storage 908 and non-removable storage 910. The various components in FIG. 11 typically are interconnected by an interconnection mechanism, such as one or more buses 930.

A computer storage medium is any medium in which data can be stored in and retrieved from addressable physical storage locations by the computer. Computer storage media includes volatile and nonvolatile memory devices, and removable and non-removable storage devices. Memory 904, removable storage 908 and non-removable storage 910 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

The computer 900 may also include communications connection(s) 912 that allow the computer to communicate with other devices over a communication medium. Communication media typically transmit computer program code, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media include any non-wired communication media that allows propagation of signals, such as acoustic, electromagnetic, electrical, optical, infrared, radio frequency and other signals. Communications connections 912 are devices, such as a network interface or radio transmitter, that interface with the communication media to transmit data over and receive data from signals propagated through communication media.

The communications connections can include one or more radio transmitters for telephonic communications over cellular telephone networks, or a wireless communication interface for wireless connection to a computer network. For example, a cellular connection, a Wi-Fi connection, a Bluetooth connection, and other connections may be present in the computer. Such connections support communication with other devices, such as to support voice or data communications.

The computer 900 may have various input device(s) 914 such as various pointer (whether single pointer or multi-pointer) devices, such as a mouse, tablet and pen, touchpad and other touch-based input devices, stylus, image input devices, such as still and motion cameras, audio input devices, such as a microphone. The computer may have various output device(s) 916 such as a display, speakers, printers, and so on, also may be included. These devices are well known in the art and need not be discussed at length here.

The various storage 910, communication connections 912, output devices 916 and input devices 914 can be integrated within a housing of the computer, or can be connected through various input/output interface devices on the computer, in which case the reference numbers 910, 912, 914 and 916 can indicate either the interface for connection to a device or the device itself as the case may be.

An operating system of the computer typically includes computer programs, commonly called drivers, which manage access to the various storage 910, communication connections 912, output devices 916 and input devices 914. Such access can include managing inputs from and outputs to these devices. In the case of communication connections, the operating system also may include one or more computer programs for implementing communication protocols used to communicate information between computers and devices through the communication connections 912.

Each component (which also may be called a "module" or "engine" or the like), of a computer system and which operates on one or more computers, can be implemented as computer program code processed by the processing system(s) of one or more computers. Computer program code includes computer-executable instructions or computer-interpreted instructions, such as program modules, which instructions are processed by a processing system of a computer. Such instructions define routines, programs, objects, components, data structures, and so on, that, when processed by a processing system, instruct the processing system to perform operations on data or configure the processor or computer to implement various components or data structures in computer storage. A data structure is defined in a computer program and specifies how data is organized in computer storage, such as in a memory device or a storage device, so that the data can accessed, manipulated and stored by a processing system of a computer.

It should be understood that the subject matter defined in the appended claims is not necessarily limited to the specific implementations described above. The specific implementations described above are disclosed as examples only.

What is claimed is:

1. A system for delivering live streaming media, comprising:
   a plurality of origin devices, wherein each origin device is configured to receive and forward a respective stream of live streaming media received from a respective broadcaster device associated with a broadcaster;
   a plurality of edge devices, wherein each edge device is configured to receive one or more respective streams forwarded from one or more respective origin devices from among the plurality of origin devices and to provide the received streams to at least one respective client device configured as a subscriber device;

a computer network interconnecting the origin devices and the edge devices for transmitting streams between the origin devices and the edge devices;

one or more mixers, each mixer configured as a respective subscriber device to receive streams of live streaming media from client devices and generate a respective mixed stream of live streaming media based on the received streams, and each mixer is configured as a respective origin device to forward the respective mixed stream as live streaming media to one or more edge devices;

a stream manager comprising a computer programmed to:
  i. assign, for each stream of live streaming media being delivered to one or more subscriber devices, a respective relationship between an origin device forwarding the stream of live streaming media and one or more edge devices receiving the stream;
  ii. in response to a request from a client device to access a stream of live streaming media, assign the client device as a subscriber device for the stream to a respective edge device among the edge devices assigned for the stream;
  iii. in response to a request from a client device to provide a stream of live streaming media as an input for a mixed stream, assign a mixer as a subscriber device to receive the input from the client device;

wherein the stream manager makes available one or more mixed streams generated by the one or more mixers to subscriber devices through edge devices as one or more streams of live streaming media.

2. The system of claim 1, wherein a first device of a first individual is connected over a broadcaster network connection to provide a first stream of live streaming media including media data of the first individual to a respective origin device of the plurality of origin devices, and the first device of the first individual is connected over a subscriber network connection to receive a second stream of live streaming media from a respective edge device among the plurality of edge devices.

3. The system of claim 2, wherein the first device of the first individual is a performer computer, wherein the first stream provided by the performer computer includes media data of the first individual, and the second stream received by the performer computer includes the respective mixed stream generated by a respective mixer among the one or more mixers.

4. The system of claim 3, wherein a second device of a second individual is a viewer computer connected over a broadcaster network connection to provide a third stream of live streaming media including media data of the second individual to a respective mixer among the one or more mixers, and the second device of the second individual is connected over a subscriber network connection to receive a fourth stream of live streaming media including a media stream based on the first stream provided by the performer computer.

5. The system of claim 1, further comprising a first device of a first individual comprising at least one performer computer providing live streaming media data of a performer and a plurality of viewer computers providing live streaming media data of a plurality of respective viewers,
  wherein the at least one performer computer is configured as a broadcaster device to provide the live streaming media data of the performer to a respective origin device among the plurality of origin devices;
  wherein the plurality of viewer computers are configured as broadcaster devices to provide the live streaming media data of the plurality of respective viewers to respective origin devices of the plurality of origin devices;
  wherein a first mixer among the one or more mixers is configured as a subscriber device to receive the live streaming media data of the plurality of respective viewers through the plurality of edge devices; and
  wherein the first mixer is further configured as a broadcaster device to provide the mixed stream to a respective origin device among the plurality of origin devices.

6. The system of claim 5, wherein the at least one performer computer is further configured as a subscriber device to receive live streaming media data based on the mixed stream through an edge device.

7. The system of claim 6, wherein the plurality of viewer computers further include viewer computers configured as subscriber devices to receive a live streaming media stream based on the live streaming media data of the performer through an edge device.

8. The system of claim 7, wherein the plurality of viewer computers further include viewer computers configured as subscriber devices to receive live streaming media data based on the mixed stream through an edge device.

9. The system of claim 5, wherein the plurality of viewer computers are further configured as subscriber devices to receive a live streaming media stream based on the live streaming media data of the performer through an edge device.

10. The system of claim 9, wherein the plurality of viewer computers further include viewer computers configured as subscriber devices to receive live streaming media data based on the mixed stream through an edge device.

11. The system of claim 5, wherein the plurality of viewer computers further include viewer computers configured as subscriber devices to receive live streaming media data based on the mixed stream through an edge device.

12. The system of claim 1, wherein a plurality of user devices for a plurality of users are configured such that each user has a respective subscriber device and a respective broadcaster device, and wherein a first mixer among the one or more mixers is configured to receive live streaming media data of at least some of the users from the plurality of user devices and the mixer is further configured as a broadcaster device to provide a first mixed stream of live streaming media data to a respective origin device among the plurality of origin devices, and wherein at least one of the user devices is configured as a subscriber device to receive the first mixed stream from the first mixer.

13. The system of claim 12, wherein the mixer is configured as a subscriber device to receive the live streaming media data of at least some of the users from the plurality of user devices through the plurality of edge devices.

14. The system of claim 1, wherein a mixer among the one or more mixers is configured as a subscriber device to receive live streaming media data from any available broadcaster device through the plurality of edge devices, and wherein the mixer is further configured as a broadcaster device to provide a mixed stream as live streaming media data to the at least one origin device.

15. The system of claim 14, wherein a plurality of user devices are configured as broadcaster devices, and the mixer is configured to receive live streaming media data from at least some of the plurality of user devices, and at least one of the user devices is configured as a subscriber device to receive the mixed stream as live streaming media data from the mixer.

16. The system of claim 14, further comprising a producer computer having access to parameters used by the mixer to generate the mixed stream, the producer computer allowing a user to specify or modify the parameters.

17. The system of claim 14, wherein the mixer has parameters to generate the mixed stream, wherein the parameters can be modified to select different streams to be mixed.

18. The system of claim 14, wherein the mixed stream comprises live streaming media data and metadata about the live streaming media data in the mixed stream.

19. The system of claim 1, wherein the streams of live streaming media provided by the one or more mixers allows participants to publish and subscribe to live streaming media data with latencies below 500 milliseconds to enable live video interaction among the participants.

20. The system of claim 1, wherein the stream manager is further configured to, in response to requests from a producer computer, associate origin devices providing selected streams of live streaming data to be mixed using the one or more mixers.

* * * * *

UNITED STATES PATENT AND TRADEMARK OFFICE
CERTIFICATE OF CORRECTION

PATENT NO. : 11,778,011 B2
APPLICATION NO. : 17/477093
DATED : October 3, 2023
INVENTOR(S) : Andrew Shaules et al.

It is certified that error appears in the above-identified patent and that said Letters Patent is hereby corrected as shown below:

In the Specification

In Column 3, Line 56, delete "device The" and insert -- device. The --.

In Column 6, Line 10, delete "to." and insert -- to --.

In Column 9, Line 65, delete "M(4,5,6). the" and insert -- M(4,5,6). The --.

In Column 14, Line 35, delete "fly" and insert -- FLV --.

Signed and Sealed this
Nineteenth Day of December, 2023

Katherine Kelly Vidal
*Director of the United States Patent and Trademark Office*